United States Patent [19]
Kuwahata et al.

[11] Patent Number: 5,590,563
[45] Date of Patent: Jan. 7, 1997

[54] ELECTRONICALLY CONTROLLED TRANSMISSION

[75] Inventors: Mitsunori Kuwahata; Eiji Nakai, both of Hiroshima, Japan

[73] Assignee: Mazda Motor Corporation, Hiroshima-ken, Japan

[21] Appl. No.: 311,014

[22] Filed: Sep. 23, 1994

[30] Foreign Application Priority Data

Sep. 27, 1993 [JP] Japan ................................. 5-264218

[51] Int. Cl.⁶ ............................................... F16H 59/02
[52] U.S. Cl. ................................. 74/337.5; 74/89.17
[58] Field of Search ........................ 74/337.5, 89.17, 74/422, 473 R

[56] References Cited

U.S. PATENT DOCUMENTS

| | | | |
|---|---|---|---|
| 829,242 | 8/1906 | Warner | 74/337.5 |
| 4,726,258 | 2/1988 | Hayashi et al. | 74/337.5 X |
| 4,848,170 | 7/1989 | Inagaki et al. | 74/6 |
| 5,076,379 | 12/1991 | Bahr et al. | 74/89.17 X |
| 5,239,894 | 8/1993 | Oikawa et al. | 74/335 X |

FOREIGN PATENT DOCUMENTS

| | | | |
|---|---|---|---|
| H 13103 | 7/1952 | Germany | 74/337.5 |
| 64-46049 | 2/1989 | Japan . | |
| 1279141A | 11/1989 | Japan | 74/337.5 |

*Primary Examiner*—Charles A. Marmor
*Assistant Examiner*—Troy Grabow
*Attorney, Agent, or Firm*—Keck, Mahin & Cate

[57] ABSTRACT

An electronically controlled transmission having a rotatable cylindrical shift drum for moving a plurality of shift rods is linked with a transmission gear mechanism so as to selectively provide various forward and reverse gears. The shift drum has a center axis of rotation laying in parallel with center axes of rotation of the main shaft and the counter shaft and is offset sideways from a plane in which the center axes of rotation of the main and counter shafts extend.

11 Claims, 13 Drawing Sheets

ELECTRONICALLY CONTROLLED TRANSMISSION

BACKGROUND OF THE INVENTION

1. Field of the Invention

The present invention relates to an improvement of an electronically controlled transmission of a type having a shift rod operated through a shift drum.

2. Description of Related Art

Transmissions are typically provided with shift rods which are selectively shifted by means of a shift lever to place the transmission in desired gears. Especially, electronically controlled transmissions are equipped with shift drums which are driven by an electric actuator. The shift drum is formed with cylindrical cam grooves with which shift rods are engaged. Gear shift operation of the shift lever causes the actuator to rotate the shift drum, causing a selective shift of the shift rods so as to place the transmission into a gear selected by the shift lever. Such an electronically controlled transmission is known from, for instance, Japanese Unexamined Patent Publication 64-46049.

One of requirements for rear-drive vehicles is to miniaturize the transmission so that it is as small as possible because the transmission is located in a small space under a floor tunnel. Though it is relatively easy to arrange the shift drum above the transmission mechanism because the shift lever is typically located in a passenger compartment, nevertheless, arranging the shift drum with its axis of rotation in parallel with and right above the transmission main shaft increases the overall height of the transmission. Such an arrangement of the shift drum leads to a bulky structure of the floor tunnel. If the transmission is brought down according to the overall height, it becomes difficult to provide a necessary ground clearance.

In order to reduce the size of a shift drum actuator, a rack and pinion mechanism is available in company with a hydraulic cylinder. In such a structure, an elongated rack must be contrived to be snugly arranged because of its long length.

SUMMARY OF THE INVENTION

It is an object of the present invention to provide an electronically controlled transmission in which the shift drum is snugly incorporated without rendering an optimum vertical arrangement of mechanical elements thereof necessary to be reorganized.

The foregoing object of the present invention is achieved by providing an electronically controlled transmission having a rotatable cylindrical shift drum for moving a plurality of shift rods linked with a transmission gear mechanism so as to selectively provide various forward and reverse gears. The rotatable drum is disposed with its center axis of rotation placed in parallel with the center axes of rotation of main and counter shafts and is offset sideways from a plane in which these center axes of rotation of the main and counter shafts lay. Each shift rod extends in parallel with both main and counter shafts and is placed or located on one side of the plane where the center axes of rotation of the main and counter shafts lay.

The shift drum is offset in the axial direction from the main-shaft gears and the counter-shaft gears and is formed with a plurality of cylindrical cam grooves in which cam follower rollers of the respective shift rods are received.

The transmission further includes a rack and pinion mechanism for causing rotation of the rotatable shift drum. A rack of the rack and pinion mechanism extends substantially in parallel with a plane between the center axes of rotation of the main shaft and the shift drum.

The parallel and offset arrangement of the axis of rotation of the shift rod and/or the shift rods with respect to the main and counter shafts precludes an increase in the overall height of the transmission without losing the easiness of snugly laying out various elements of the transmission. In addition, the parallel arrangement of the rack with respect to the main and counter shafts prevents the transmission from being bulky and spacious.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
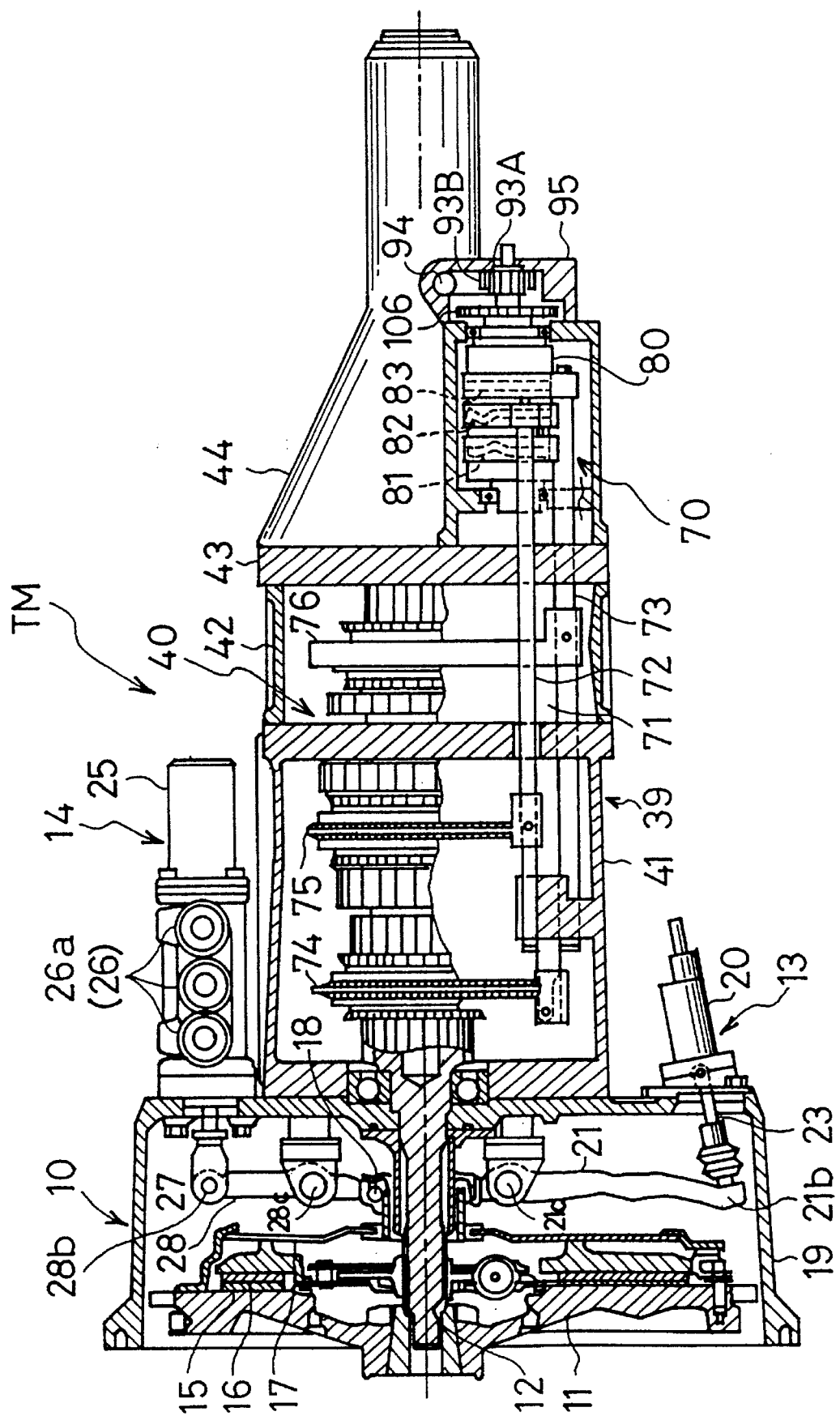
FIG. 1 is a longitudinal cross sectional view of an electronically controlled transmission in accordance with a preferred embodiment of the present invention.
Figure 2:
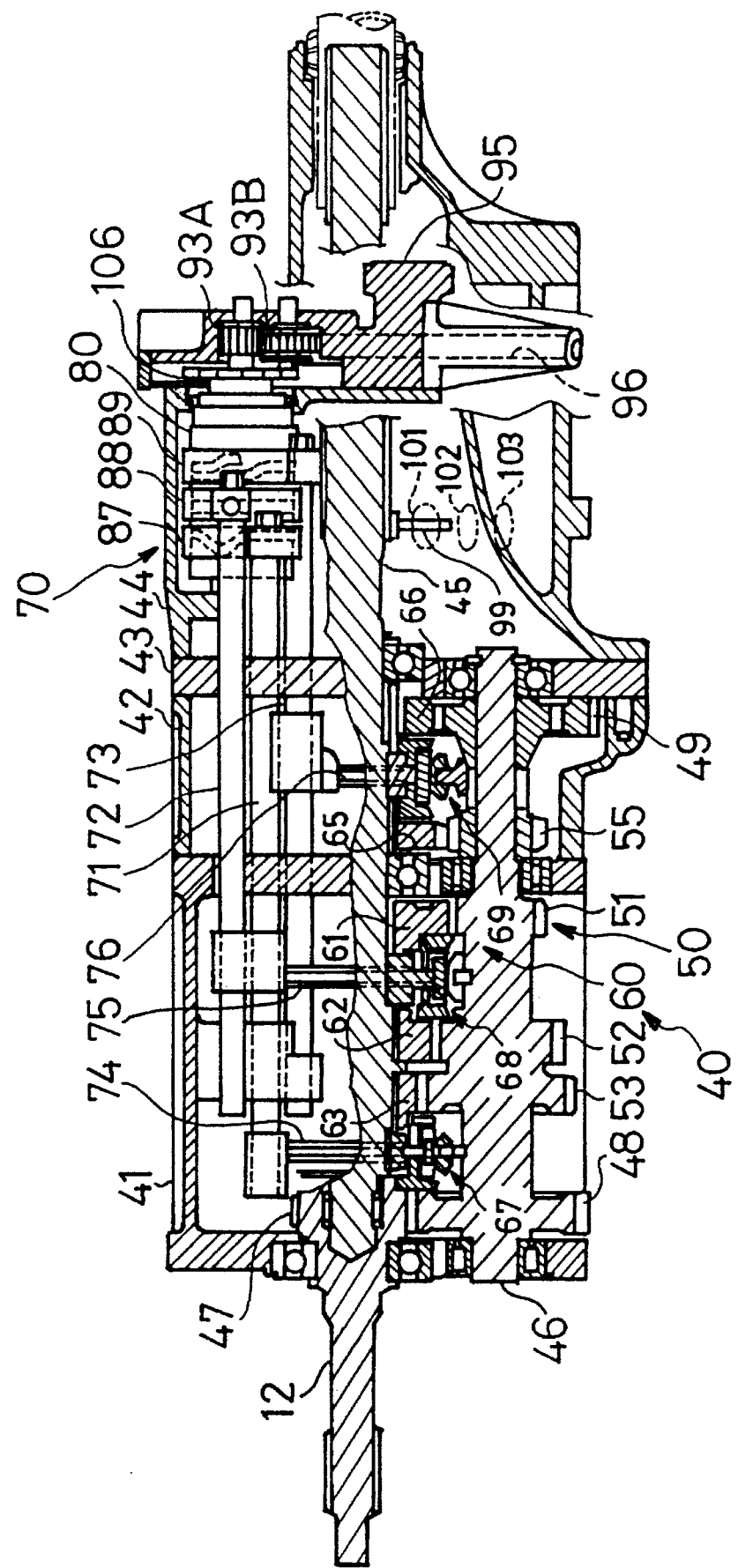
FIG. 2 is a longitudinal sectional view, perpendicular to FIG. 1, of the electronically controlled transmission.
Figure 3:
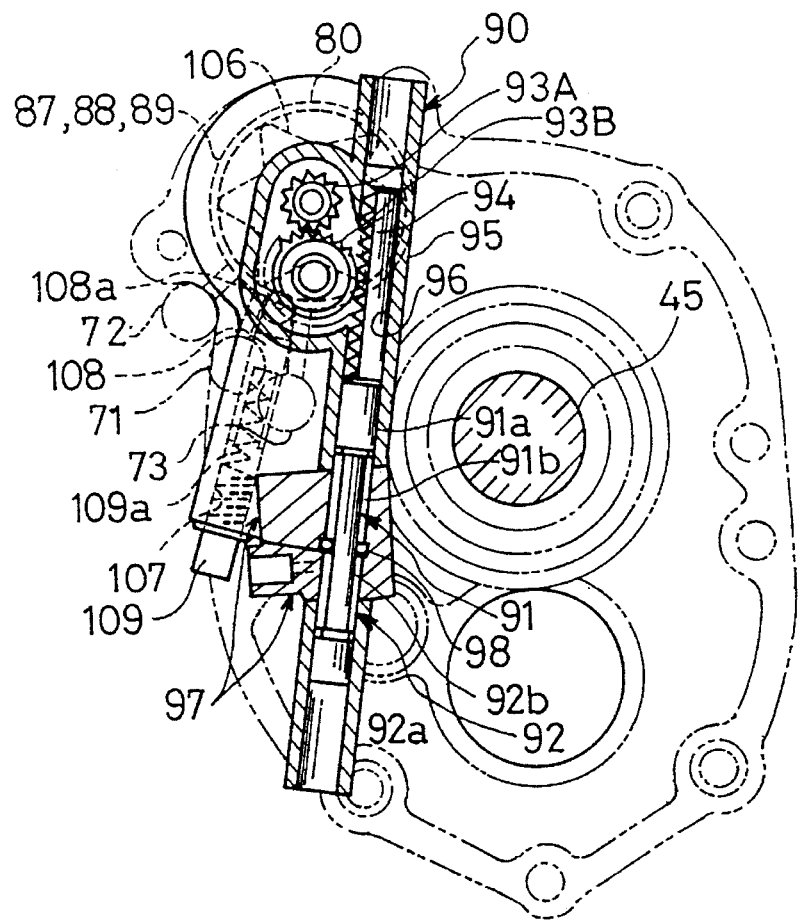
FIG. 3 is a transverse cross-sectional view of the electronically controlled transmission.

Referring now to the drawings in detail, and in particular, to FIGS. 1–3, an electronically controlled transmission (which is hereafter referred to simply as a transmission) TM, which is installed, by way of example, in a rear-drive passenger car, has an input shaft extending in a lengthwise direction of the car from the front to the back. The transmission TM includes a clutch mechanism 10, a transmission gear mechanism 40, and a gear shift mechanism 70. The clutch mechanism 10 is housed in a clutch case 19. The transmission gear mechanism 40 and gear shift mechanism 70 are housed in a transmission case assembly 39. Briefly describing, the transmission case assembly 39 comprises a generally open-ended box-shaped front case 41 secured to the clutch case 19, a cylindrical intermediate case 42 secured to the front case 41 and a generally cone-shaped rear case 44 secured to the intermediate case 42 through a partition wall plate 43. These clutch mechanism 10 and gear shift mechanism 40 are properly actuated by means of a hydraulic control system which will be described later.

As clearly seen in particular in FIG. 1, the clutch mechanism 10 is similar to what is called a pull-type clutch for connecting and disconnecting transmission of the engine torque between a fly-wheel 11 mechanically connected to an engine output shaft (not shown) and a transmission input shaft 12. The clutch mechanism 10 may take any pull-type, or otherwise any push-type, well known to those skilled in the art. It is uniquely equipped with an automatic clutch control mechanism 14 in addition to a typical manual clutch operating mechanism 13 operationally linked to a clutch pedal. This clutch mechanism 10 includes a clutch disk 15, a pressure plate 16, a diaphragm spring 17, a release bearing, etc. as essential parts like those of conventional clutch mechanisms. These clutch operating mechanisms 13 and 14 are arranged in diametrically opposite positions with respect to the transmission input shaft 12.

Figure 6:
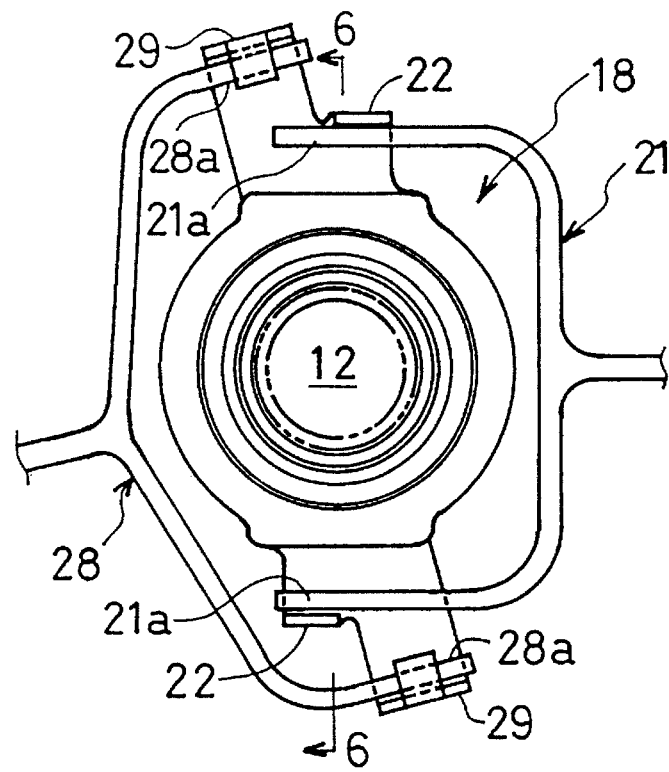
FIG. 6 is a front view of a clutch mechanism of the electronically controlled transmission.
Figure 7:
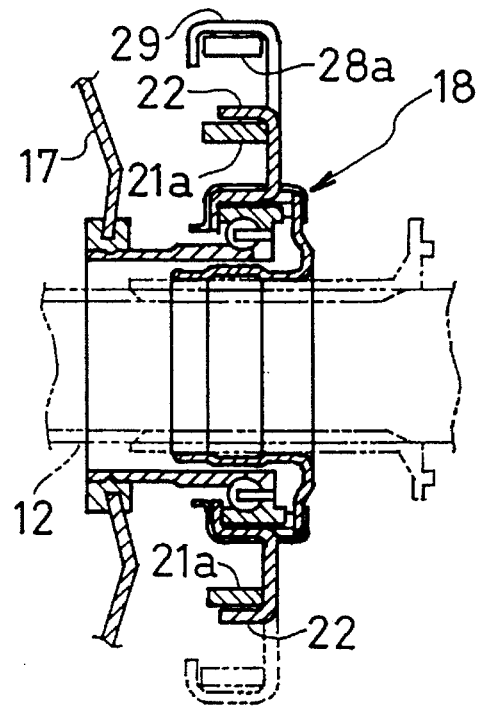
FIG. 7 is a detailed longitudinal sectional view of a part of the clutch mechanism.

The manual clutch operating mechanism 13 includes a hydraulic cylinder 20 secured to a left portion of a rear wall of the clutch case 19 and a first release fork 21 extending transversely inside the clutch case 19 and rotatable on a pivot shaft 21c. This hydraulic cylinder 20 is operationally linked to the clutch pedal by means of the hydraulic control system. As seen in FIGS. 6 and 7, the first release fork 21 engages at its forked end 21a a pair of first radial arms 22 of a bearing 18 mounted for axial movement on the transmission input shaft 12. These first radial arms 22 are generally L-shaped and formed as integral parts of the bearing 18 in diametrically opposite positions. The first release fork 21 is pivotally linked at another end 21b with a piston rod 23 of the hydraulic cylinder 20. By means of the manual clutch operating mechanism 13, when the clutch pedal is depressed, the hydraulic cylinder 20 is hydraulically activated to thrust the piston rod 23, causing pivotal movement of the first release fork 21 in the clockwise direction as viewed in FIG. 1 on the pivot shaft 21c so as to shift the bearing 18 backward. As a result, the diaphragm spring 17 supported by the bearing 18 is relaxed to allow slippage between the clutch disk 15 and the pressure plate 16 so as thereby to uncouple or release the clutch mechanism 10.

Similarly, the automatic clutch operating mechanism 14 includes a hydraulic cylinder 25, serving as an actuator, secured to the right portion of the rear wall of the clutch case 19 diametrically opposite to the side where the hydraulic cylinder 20 of the manual clutch operating mechanism 13 is positioned and a second release fork 28 rotatable on a pivot shaft 28c extending transversely inside the clutch case 19. As seen in FIGS. 6 and 7, the second release fork 28 engages at its forked end 28a a pair of second radial arms 21 of the bearing 18. The engagements of these forked ends 21a and 28a are made in opposite directions to each other. These second radial arms 29 are generally L-shaped and formed as integral parts of the bearing 18 in diametrically opposite positions and at equal angular separations from the first radial arms 22. The second release fork 28 is pivotally linked at another end 28b with a piston rod 27 of the hydraulic cylinder 25. As shown in FIG. 1, the hydraulic cylinder 25 is provided with an electromagnetic valve means 26 including a plurality of solenoid valves 26a. These solenoid valves 26a are selectively actuated to permit different levels of hydraulic pressure to be supplied to the hydraulic cylinder 25 from the hydraulic control system. At any level of hydraulic pressure, the hydraulic cylinder 25 is hydraulically activated to thrust the piston rod 27, causing the second release fork 28 in the counterclockwise direction as viewed in FIG. 1 on the pivot shaft 28c so as to shift the bearing 18 backward. As a result, the diaphragm spring 17 is relaxed to allow slippage between the clutch disk 15 and the pressure plate 16 so as thereby to uncouple or release the clutch mechanism 10. In this instance, the clutch operation is transmitted from one to another between the clutch operating mechanisms 13 and 14 through the backward shift of bearing 18.

The transmission gear mechanism 40 is of a typical type having five forward speed gears and a reverse gear. Briefly describing, the transmission gear mechanism 40 is housed in a transmission case 39, in particular within the front and intermediate cases 41 and 42. A main shaft 45 is supported for rotation by and within the front and intermediate transmission cases 41 and 42. Similarly, a transmission counter shaft 46 is supported for rotation by and within the front and intermediate transmission cases 41 and 42. Center axes of rotation of these main and counter shafts 45 and 46 are placed parallel at a vertical separation in a vertical plane. The transmission counter shaft 46 is formed at its front end portion with an integral input gear 48 in engagement with an end gear 47 integrally formed on the rear end portion of the transmission input shaft 12. The transmission counter shaft 46 is provided with a series of counter-shaft gears 50, namely in order from the input end a third gear 53, a second gear 52, a first gear 51, a fifth gear 55 and a reverse gear 49. On the other hand, the transmission main shaft 45 is provided with a series of main-shaft gears 60 mounted for rotation thereon, namely in order from the input end a third gear 63, a second gear 62, a first gear 61, a fifth gear 65 and a reverse gear 66 which are, respectively, engageable with the counter-shaft gears 53, 52, 51, 55 and 49. The transmission main shaft 47 is further provided with three synchronizing mechanisms, namely in order from the input end a 4th/3rd synchronizing mechanism 67, a 2nd/1st synchronizing mechanism 68, and a 5th/reverse synchronizing mechanism 69. Each of these synchronizing mechanisms 67–69 is shiftable between forward and rearward positions. The 4th/3rd synchronizing mechanism 67 provides a fourth speed gear in which the torque of the input shaft 12 is directly transmitted to the transmission main shaft 45 at the forward position and provides a third speed gear at the rearward position. The 2nd/1st synchronizing mechanism 68 provides a second speed gear at the forward position and a first speed gear at the rearward position. Similarly, the 5th/reverse synchronizing mechanism 69 provides a fifth speed gear at the forward position and a reverse gear in which the torque of transmission counter shaft 46 is transmitted to the transmission main shaft 45 by means of the engagement with the reverse gears 49 and 66.

These synchronizing mechanisms 67–69 are shifted between the forward and rearward positions by a shift mechanism 70 which is housed in the rear case 44 of the transmission case assembly 39. As shown in FIGS. 1–5, this shift mechanism 70 includes first to third shift rods 71, 72 and 73 and a shift drum 80 formed with three cylindrical cam grooves 81, 82 and 83. These first to third shift rods 71, 72 and 73 are, on one hand, linked with the first to third synchronizing mechanisms 67, 68 and 69, respectively, and, on the other hand, engaged with the shift cam grooves 81, 82 and 83, respectively. The shift mechanism 70 cooperates with a pinion and rack mechanism 90 for rotating the shift drum 80 in opposite directions. The shift drum 80 is disposed within the rear case 44 and arranged on the left side of and below the transmission main shaft 45 as viewed in longitudinal cross section and below the transmission main shaft 45 as viewed in longitudinal and transverse cross sections. Specifically, the center axis of rotation of the shift drum 80 is in parallel with the center axes of rotation of the main and counter shafts 45 and 46 and is offset to the left from the vertical plane in which the center axes of rotation of the main and counter shafts 45 and 46 lay. Similarly, the center axes of these shift rods 71–73 are offset to the left from the vertical plane in which the center axes of rotation of the main and counter shafts 45 and 46 lay as well as the shift drum 80.

Figure 4:
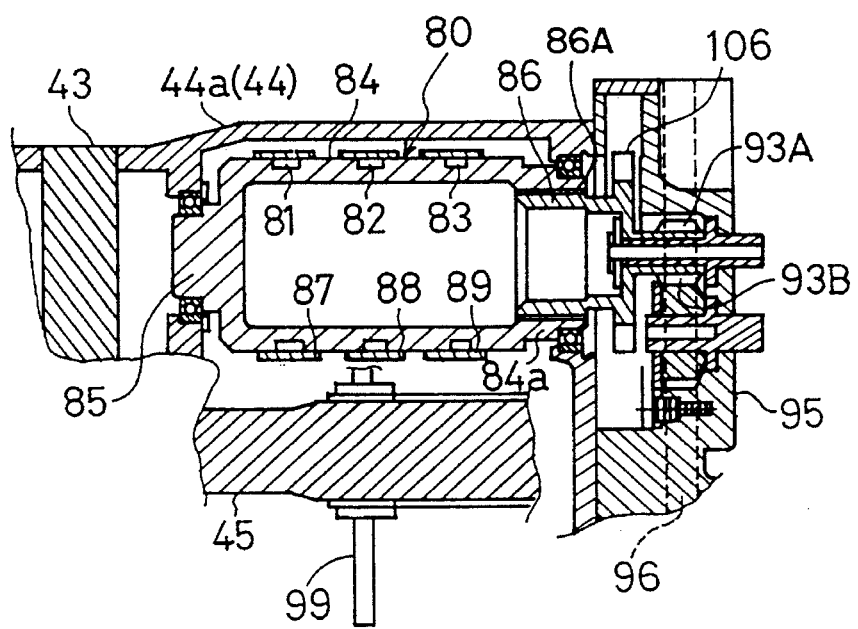
FIG. 4 is a detailed longitudinal sectional view of a part of the electronically controlled transmission around a shift drum.

As shown in FIG. 4, the shift drum 80 is configured so as to have a cylindrical drum body 84 and an integral journal 85 extending forward from the cylindrical drum body 84. The cylindrical drum body 84 is formed with an annular wall 84a forming a rear open end in which a pinion shaft 86 is fitted by means of spline engagement. The shift drum 80 is supported for rotation by the rear case 44 through bearings. An opening of the rear case 44 for access to the shift drum 80 is closed by a cover 44a.

As was previously mentioned, the drum body 84 is formed with external cylindrical cam grooves, namely in order from the input end, first, second and third shift cam grooves 81, 82 and 83. The first to third shift rods 71≧73, which are supported for back and forth linear slide movement by the transmission case assembly 40, are, on one hand, linked at their one ends with the cylindrical cam grooves 81–83, respectively, and, on the other hand, provided at other ends with first to third shift forks 74–76, respectively, which are secured to the shift rods 71–73 and extend to and are linked with the first to third synchronizing mechanisms 67–69, respectively.

Figure 5:
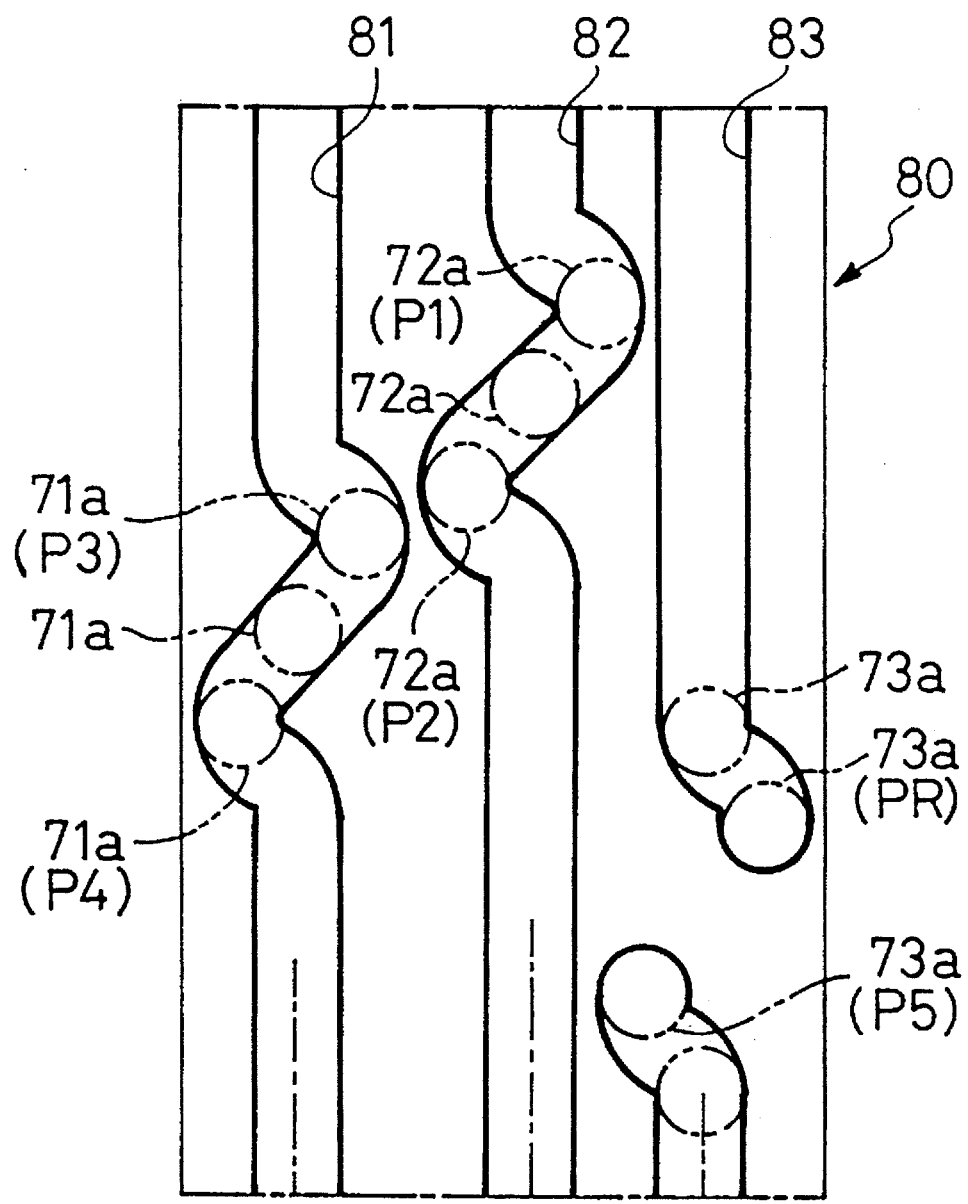
FIG. 5 is a developed view of the shift drum

As shown in detail in FIGS. 4 and 5, first to third annular rings 87–89, which are secured directly or indirectly to the one ends of the shift rods 71–73, respectively, are mounted for rotation on the drum body 84 so as to cover the cam grooves 81–83, respectively. These annular rings 87–89 are provided with first to third rollers 71a–73a which are supported for rotation by the annular rings 87–89, respectively, and received for slide movement within the shift cam grooves 81–83 as cam followers, respectively.

Referring to FIG. 5 showing the details of the shift cam grooves 81–83, these shift cam grooves 81–83 have specific cam positions P1, P2, P3, P4, P5 and PR which are different in position in the direction of the center axis of rotation of the shift drum 80 and in the circumferential direction. When the shift drum 80 turns and places the first cam follower roller 71a into the position P4 from the position P3, it shifts the first shift rod 71 so as to cause the first synchronizing mechanism 67 to shift the transmission gear mechanism 40 to the fourth speed gear from the third speed gear. Conversely, when the shift drum 80 turns and places the first cam follower roller 71a into the position P3 from the position P4, it shifts the first shift rod 71 so as to cause the first synchronizing mechanism 67 to shift the transmission gear mechanism 40 to the third speed gear from the fourth speed gear. Similarly, when the shift drum 80 turns so as to change the second cam follower roller 72a between the positions P1 and P2, it shifts the second shift rod 72 so as to cause the second synchronizing mechanism 68 to shift the transmission gear mechanism 40 between the first and second speed gears. When the shift drum 80 turns so as to change the third cam follower roller 73a between the positions P5 and PR, it shifts the third shift rod 73 so as to cause the third synchronizing mechanism 69 to shift the transmission gear mechanism 40 between the fifth speed gear and the reverse gear. In order to prevent the transmission mechanism 40 from being accidentally shifted into the reverse gear directly from fifth speed gear, only the third shift cam groove 83 is discontinuous between the positions P5 and PR.

As seen clearly in FIGS. 1, 3 and 4, the pinion and rack mechanism 90 includes a pinion 86A integrally formed with the pinion shaft 86 which is fitted into the annular wall 84a of drum body 84 by means of spline engagement, and a pinion 93B which is disposed below the pinion 93A so as to be in mesh with the pinion 93A. A rack 94, which is in mesh with the pinion 93B, is disposed approximately in parallel with the vertical plane in which the center axes of rotation of the main and counter shafts 45 and 46 lay and extends approximately vertically between the center axes of rotation of the main and counter shafts 45 and 46. Further, the rack 94 is fitted for up and down slide movement into guide bores 96 formed in a rack case 95 secured to the rear case 44. The pinion and rack mechanism 90 cooperates with first and second hydraulic cylinders 91 and 92 serving as a hydraulic actuator for moving up and down the rack 94. These first and second hydraulic cylinders 91 and 92 are separated by a sealing ring 98 so as to form first and second pressure chambers 91b and 92b. Piston rods 91a and 92a are formed as a mechanically integral part of the rack 94. The pinion and rack mechanism 90 further includes servo valves 97 for supplying controlled hydraulic pressure into the first and second pressure chambers 91b and 92b.

During supplying hydraulic pressure into the first pressure chamber 91b of the first hydraulic cylinder 91, discharging hydraulic pressure from the second pressure chamber 92b of the second hydraulic cylinder 92 causes upward movement of the rack 94, forcing the pinion 93B to turn in the counterclockwise direction, and hence, the pinion 93A to turn in the clockwise direction as viewed in FIG. 3. Conversely, during supplying hydraulic pressure into the second pressure chamber 92b of the second hydraulic cylinder 92, discharging hydraulic pressure from the first pressure chamber 91b of the first hydraulic cylinder 91 causes downward movement of the rack 94, forcing the pinion 93B to turn in the clockwise direction, and hence, the pinion 93A to turn in the counterclockwise direction as viewed in FIG. 3. Accordingly, by selectively supplying hydraulic pressure into the first and second hydraulic cylinders 91 and 92 at different rates and discharging hydraulic pressure from the first and second hydraulic cylinders 91 and 92, the shift drum 80 is turned in any desired directions at desired speeds.

In order to hold the shift drum 80 in a neutral position, the shift mechanism 70 is equipped with a fail-safe feature. The pinion and rack mechanism 90 has a star-shaped restraint cam 106 and a restraining rod 108. This restraint cam 106 is secured to, or otherwise integrally formed with, the pinion shaft 86 and positioned forward from the pinion 93A. On the other hand, the restraint rod 108 having a roller 108a is fitted for up and down slide movement in an approximately vertically extending bore 107 formed in the left side portion of the rack case 95. The restraint rod 108 is forced upward by means of a coil spring 109a disposed within the bore 107 so as to bring the roller 108a into contact with one of roots of the star-shaped restraint cam 106. An adjustment screw 109 is provided for the utilization of appropriate restraining force. Since roots of the star-shaped restraint cam 106 correspond in position to neutral positions of the shift cam grooves 81–83 of the shift drum 80, when the shift mechanism 70 places the shift drum 80 in neutral positions wherein the cam follower rollers 71a–73a are out of the specific cam positions P1, P2, P3, P4, P5 and PR, the roller 108a of the restraint rod 108 is urged against any one of the roots of the star-shaped restraint cam 106, so as to hold the shift drum 80 in the neutral positions.

Rotation of the transmission main shaft 45 is detected by means of electronic pick-up sensors 101,102 and 103. The transmission main shaft 45 is provided with a rotor 99 which is integrally formed with six fins radially extending therefrom. The electronic pick-up sensors 101–103 are secured to the rear case 44 and arranged side by side in the lengthwise direction so as to detect the rotating fins. When the electronic pick-up sensors 101–103 detects the rotating fins, they provide signals for a control unit 100 which finds the speed and direction of rotation of the transmission main shaft 45 based on the signals. In this instance, the electronic pick-up sensors 101–103 are at a level lower than an oil surface in the rear case 44. While the rotor 99 rotates, these fins splash oil toward the shift drum 80, so as to lubricate sufficiently between the shift cam grooves 81–83 and the cam follower rollers 71a–73a and between the shift drum 80 and its shaft.

Figure 8:
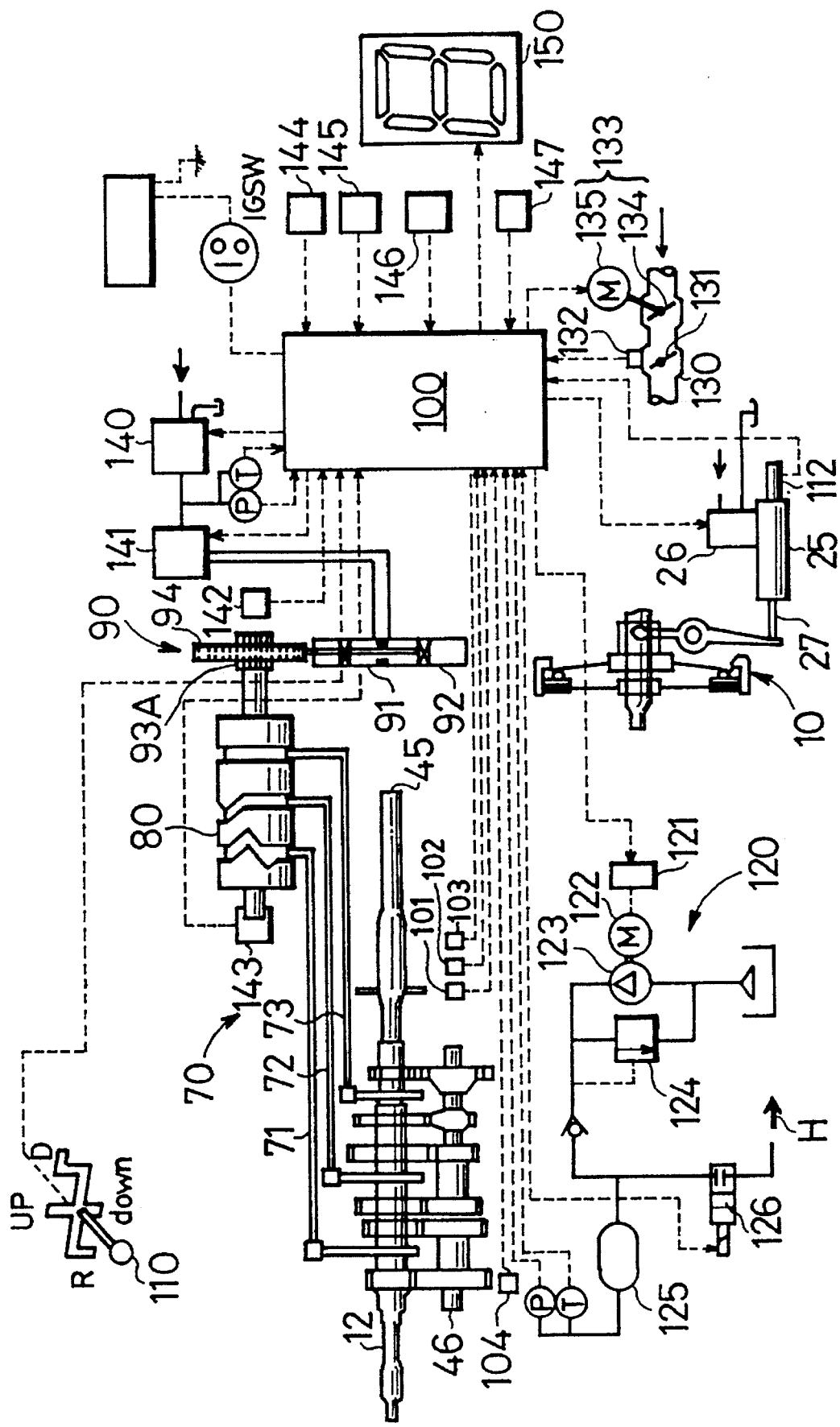
FIG. 8 is a diagrammatic illustration of a control system for the electronically controlled transmission.

Referring to FIG. 8, schematically showing the control system for the electronically controlled transmission TM, the control unit 100, which incorporates therein a microcomputer, governs or controls the hydraulic cylinder actuator 25 of the clutch mechanism 10, the hydraulic cylinder actuators 91 and 92 of the shift mechanism 70, and an electric valve control mechanism 133 according to operations of a shift lever 110 of the transmission TM. Further, the control unit 100 controls a gear display 150. The shift lever 110 cooperates with a plurality of switches which are turned on at various lever positions to provide shift command signals, namely a shift-up command signal, a shift-down command signal, a drive range command signal and a reverse command signal, respectively. A hydraulic pressure source 120 includes an oil pump 123 driven by a motor 122 for generating a predetermined pressure H. The motor 122 is associated with a relay 121. The oil pump 123 is associated with a regulator valve 125, an accumulator 124 and an electronic direction valve 126. There are provided in the path of oil a pressure sensor and a temperature sensor indicated by characters "P" and "T," respectively.

The control unit receives various control signals. The hydraulic cylinder actuator 25 of the clutch mechanism 10 is associated with an electronically controlled regulating valve 26 and a position sensor 112. The regulating valve 26 regulates hydraulic pressure so as to protrude the piston rod 27 to predetermined positions. The position sensor 112 detects positions of protrusion of the piston rod 27 and provides position signals for the control unit 100. The electric valve control mechanism 133 includes a secondary throttle valve 134 disposed in an intake pipe 130 upstream from a primary throttle valve 131 and a motor 135 by which the secondary throttle valve 134 is driven. A throttle sensor 132 detects a valve opening of the primary throttle valve 131 and provides a signal representative of the valve opening for the control unit. The hydraulic cylinder actuators 91 and 92 of the shift mechanism 70 are supplied with hydraulic pressure whose level, direction and rate are controlled by a duty solenoid valve 140 and a servo valve 141. A pick-up type of electronic position sensor 142 is equipped in connection with the pinion and rack mechanism 90, with which these hydraulic cylinder actuators 91 and 92 are directly associated, to detect a rotated angle of the pinion 93A and provides an angle signal representative of the rotated angle for the control unit 100. Further, a position sensor 143, such as a potentiometer, is equipped to detect an axial position of the shift drum 80 and provides a position signal representative of the axial position for the control unit 100. Further, the control unit 100 receives various other signals, such as an engine speed signal from a speed sensor 144, a vehicle speed sensor from a speed sensor 145, a yaw rate signal from a yaw rate sensor 147, a brake signal from a brake switch 146, a starter switch signal, a road surface friction signal from an anti-skid braking system (ABS), a slip signal indicative of slippage of four wheels, etc. These sensors are well known to those skilled in the art and may take any known type.

The gear display 150 provides the driver with visual indications of gear status in the form of numbers and letters, such as "1"–"5" indicative of the first to fifth speed gears, respectively, "0" indicative of prohibition of gear shifts, "R" indicative of the reverse gear, "A" indicative of an automatic shift mode for a drive range, and "F" indicative of a failure of the control system.

The control unit 100 basically controls electrically operations of the clutch mechanism 10 and the shift mechanism 70 so as to place the transmission TM in any desired status according to shift positions selected by the shift lever 110. For example, immediately after starting, the control unit 100 shifts the transmission gear mechanism 40 into the first gear speed. Corresponding to a shift-up operation of the shift lever 110, the control unit 100 shifts up the transmission gear mechanism 40 one speed step from a lower speed gear to an adjacent higher speed gear, specifically, from the first speed gear to the second speed gear, from the second speed gear to the third speed gear, from the third speed gear to the fourth speed gear, or from the fourth speed gear to the fifth speed gear. Conversely, corresponding to a shift-down operation of the shift lever 110, the control unit 100 shifts down the transmission gear mechanism 40 one speed step from a higher speed gear to an adjacent lower speed gear, specifically, from the fifth speed gear to the fourth speed gear, from the fourth speed gear to the third speed gear, from the third speed gear to the second speed gear, from the second speed gear to the first speed gear, and from the first speed gear to neutral. When the shift lever 110 selects the reverse gear, the control unit 100 shifts the transmission gear mechanism 40 into the reverse gear.

The control unit 100 performs a programmed automatic shift control according to vehicle speeds and throttle openings in the same manner as conventional automatic transmissions when the shift lever 110 selects the drive range. In addition, the control unit 100 performs a programmed manual shift control which will be hereafter described in detail.

The operation of the transmission control system as depicted in FIG. 8 will be best understood from the following description with reference to FIGS. 9, 10, 11A and 11B, and 12A and 12B, which are flow charts illustrating a main control routine and subroutines for the microcomputer of the control unit 100. Programming a computer is a skill well understood in the art. The following description is written to enable a programmer having ordinary skill in the art to prepare an appropriate program for the microcomputer. The particular details of any such program would of course depend upon the architecture of the particular computer selected.

Figure 9:
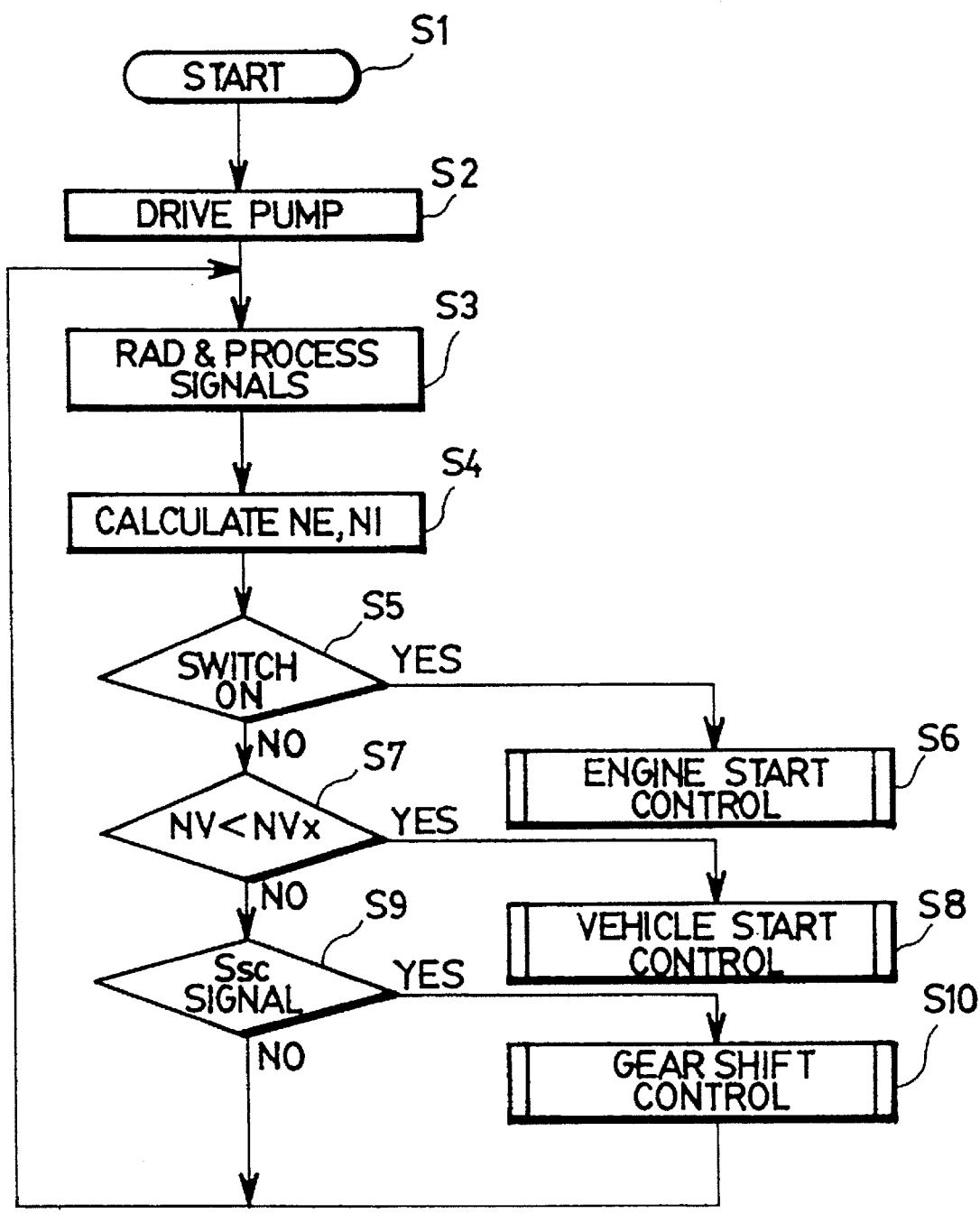
FIG. 9 is a flow chart illustrating the transmission control main routine.

Referring to FIG. 9, which is a flow chart of the manual shift control routine which is cyclicly executed until an ignition key or a starter switch is turned off, control commences with a switching operation of the ignition key to ON status at step S1 and directly proceeds to a function S2 where the oil pump 123 is started. After reading and processing various control signals from the sensors at step S3, a rotational speed of engine NE and a rotational speed of transmission input shaft N1 are calculated based on values represented by these signals at step S4. Subsequently, a decision is made at step S5 as to whether the engine has started. If the answer to the decision is "YES," then, the control unit 100 executes a control in an engine start mode shown in FIG. 10 at step S6.

If the answer to the decision is "NO," this indicates that the engine has started. Then, a decision is made at step S7 as to whether a vehicle speed NV has reached a predetermined speed NVx. If the vehicle speed NE is still lower than the predetermined speed NVx, then, the control unit 100 executes a control in a vehicle start mode shown in FIGS. 11A and 11B at step S8. While the vehicle travels, a decision is made at step S9 as to whether a shift command signal (Ssc) has been provided. If there is any shift command signal, then, the control unit 100 executes a control in a gear shift mode shown in FIGS. 12A and 12B at step S10.

Figure 10:
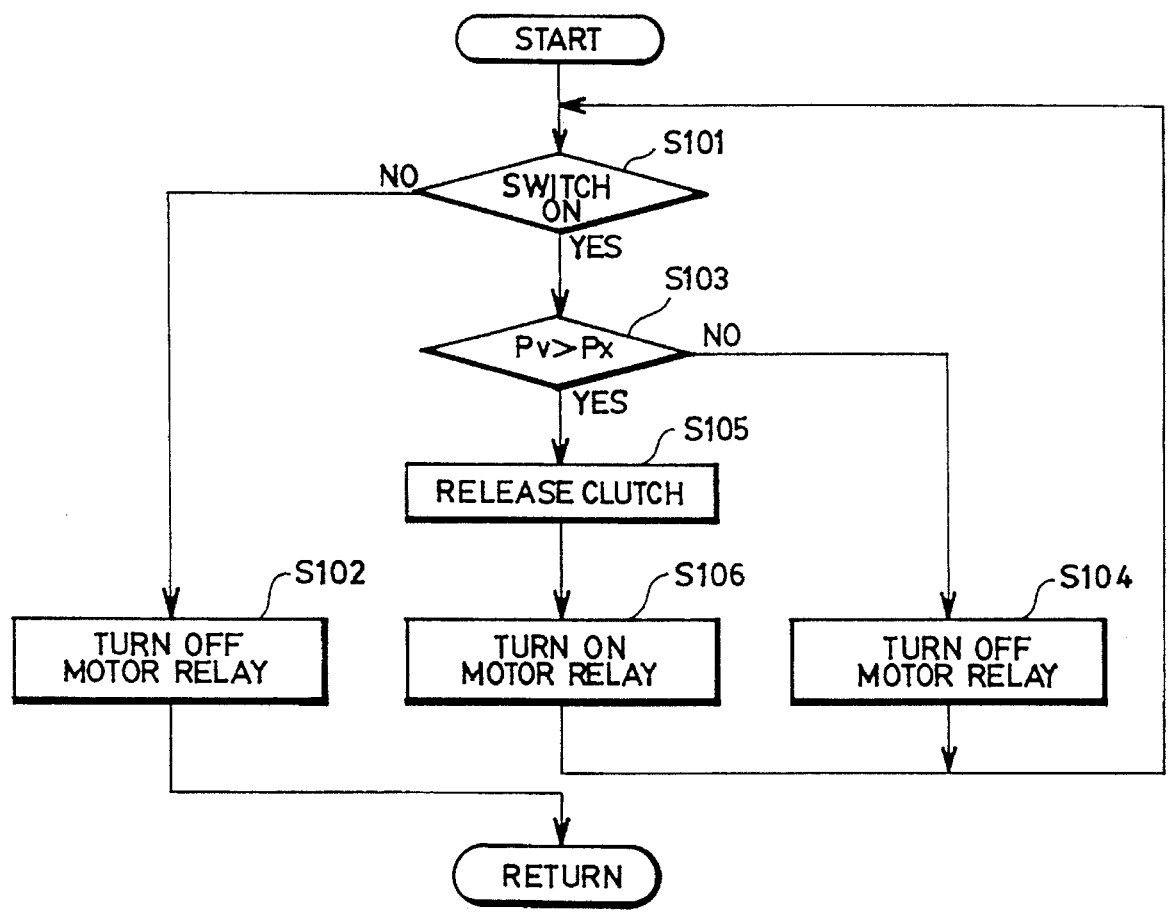
FIG. 10 is a flow chart illustrating the engine start control subroutine.

Referring to FIG. 10, which is a flow chart of the engine start control subroutine, control directly proceeds to step S101 where a decision is made as to whether the starter switch has been turned on. If the starter switch has been turned off, after turning a starter motor relay off at step S102, the control returns to the main routine. On the other hand, when the starter switch is turned on, a decision is made based on a signal from the pressure sensor P (see FIG. 8) at step S103 as to whether a predetermined level of hydraulic pressure (HPx) has developed. If the hydraulic pressure in the control system is still lower than the predetermined pressure level (HPx), then, the starter motor relay is turned off at step S104 and another cycle of the engine start control subroutine commences. When the hydraulic pressure reaches above the predetermined pressure level (HPx), the hydraulic pressure is supplied to the actuator 25 of the clutch mechanism 10 through the regulating valve 26 so as to uncouple or release the clutch mechanism 10. Subsequently, the starter motor relay is turned on to start the starter motor, and hence the engine, at step S106. Subsequently, another cycle of the engine start control subroutine is executed.

Figure 11A:
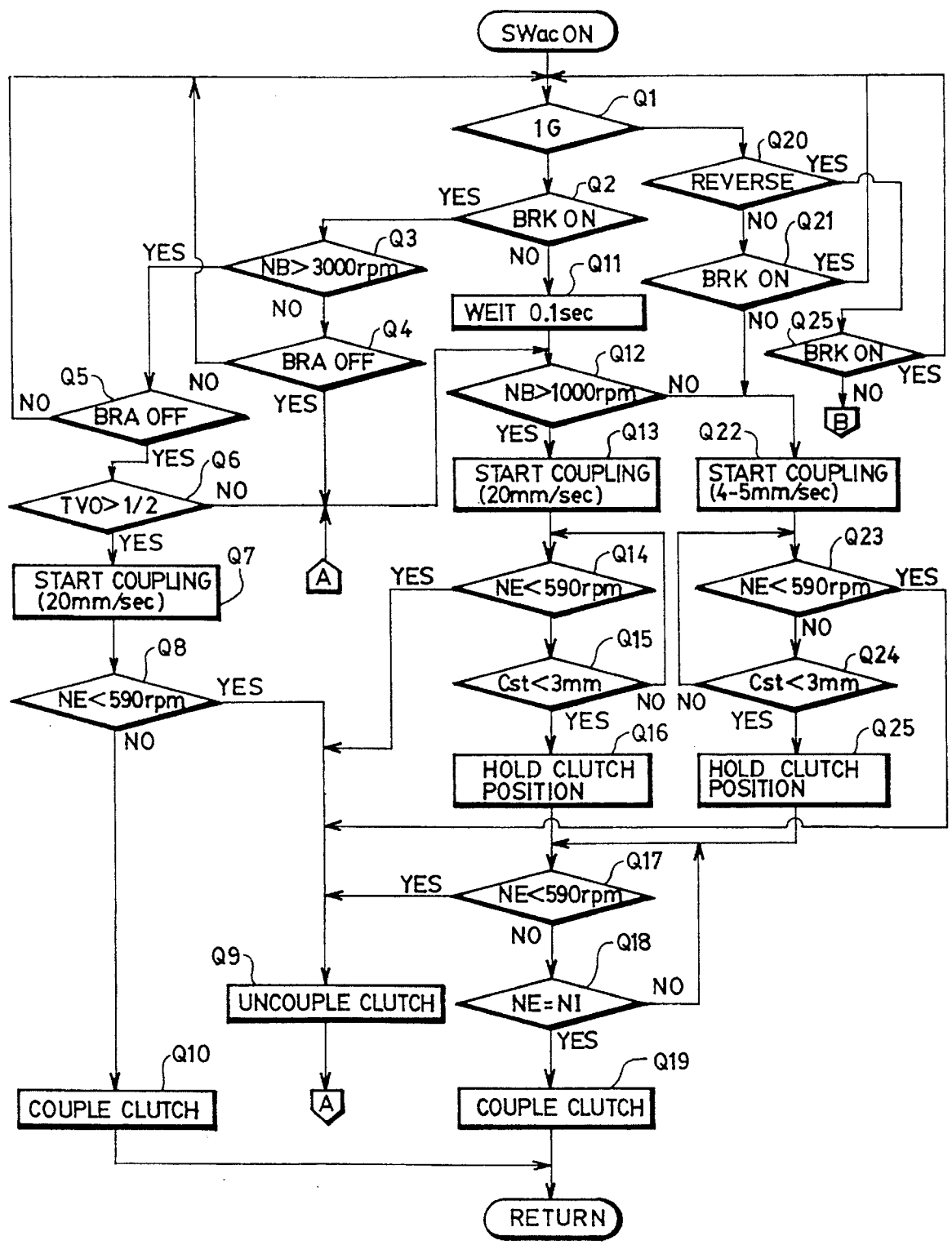
FIG. 11A and 11B are a flow chart illustrating the vehicle start control subroutine;.
Figure 11B:
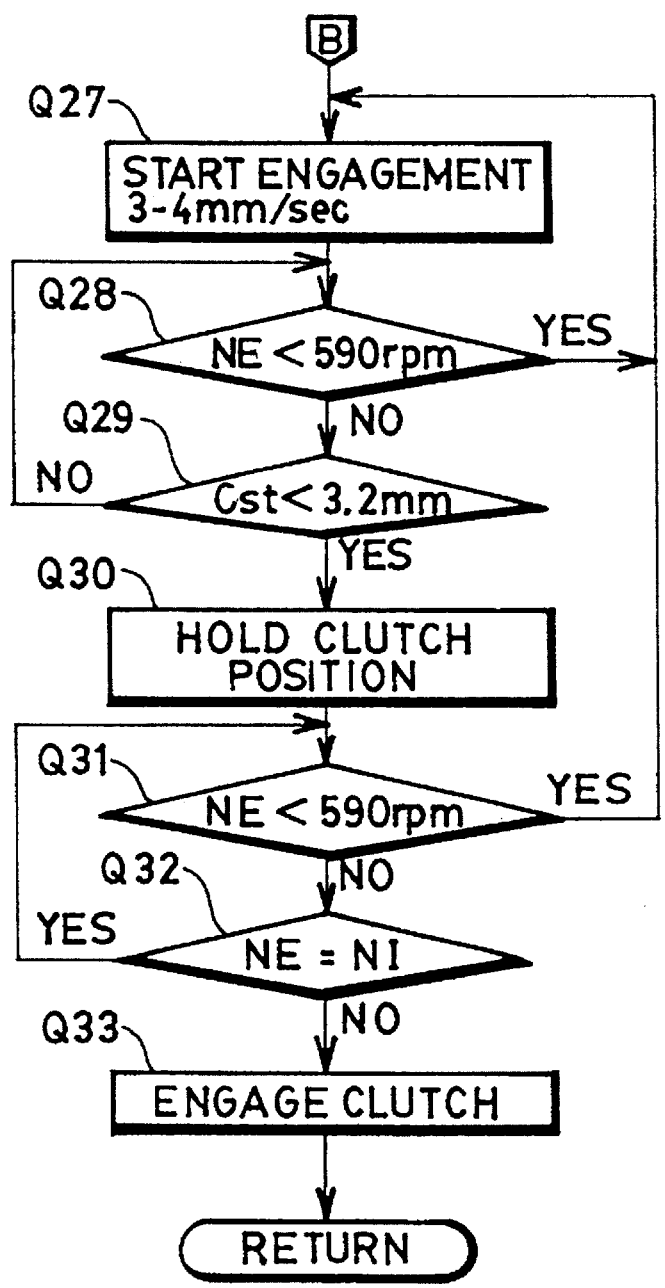

Referring to FIGS. 11A and 11B, which are flow charts of the vehicle start control subroutine for governing engaging of the clutch mechanism 10, in particular the clutch disk 15 and the pressure plate 16, in various vehicle start modes, such as a rapid start, a moderate start, a slow start, and a reverse start, control commences and proceeds to a decision at step Q1 as to whether there is provided a shift-up command signal to the first speed gear (1G). When it is judged at step Q2 that the brake is applied in the first gear, a decision is made based on an engine speed signal from the speed sensor 144 at step Q3 as to whether the speed of the engine NE is higher than a predetermined limit speed of, for example, 3,000 rpm. The judgement of brake application is made based on a brake application (BRK ON) signal from the brake switch 146. When the engine speed NE is higher than the predetermined limit speed, a decision is made at step Q5 as to whether the brake switch 146 is turned off (BRKOFF), or whether the brake is released. If the throttle valve 131 is judged at step Q6 to open larger than a half opening (½) while brake is released, then this indicates that the vehicle is quickly started. At this time, engaging of the clutch (the clutch disk 15 and the pressure plate 16) starts quickly at step Q7. When it is judged at step Q8 that the engine has increased its speed (NE) higher than a critical speed of, for instance, 590 rpm. for an engine stall, the clutch is engaged at step Q10. However, when the engine speed NE has not yet reached the critical speed of 590 rpm., then, because it is feared that an engine stall will take place, the clutch is released or disengaged at step Q9.

As a result of the decisions made at steps Q1 and Q2, when it is judged that brake is released (BRK OFF) while the transmission TM is in the first speed gear (1G), this indicates that the vehicle is starting moderately. Then, a decision is made at step Q12 after 0.1 second waiting at step Q11 as to whether the engine has increased its speed NE higher than a speed of, for instance, 1,000 rpm. If the engine speed NE is higher than the speed of 1,000 rpm., then, engaging of the clutch (the clutch disk 15 and the pressure plate 16) starts quickly at step Q13. Thereafter, when the engine decreases its speed NE lower than the critical speed of 590 rpm. at step Q14, then, the clutch is held engaged slightly at steps Q15 and Q16. Clutch-slipping is detected based on a clutch separation which is the axial distance between the clutch disk 15 and the pressure plate 16. In this instance, proper clutch-slipping is provided at a clutch separation of less than 3 mm. Thereafter, when the engine speed NE reaches higher than the critical speed of 590 rpm. at step Q17 and the transmission input shaft 12 increases its speed NI to the engine speed NE at step Q18, the clutch is engaged at step Q19. If the engine speed NE still stays at a speed NE lower than the critical speed of 590 rpm. even after a continuance of clutch-slipping, then, the clutch is disengaged at step Q9.

In gears other than the first gear (1G), if brake is applied or on at step Q21 while there is not provided a reverse command signal at step Q20, then this indicates that the vehicle starts at a crawling speed. Then, engagement of the clutch (the clutch disk 15 and the pressure plate 16) takes place and progresses slowly at step Q22. Thereafter, when the engine decreases its speed NE lower than the critical speed of 590 rpm. at step Q23, then, the clutch is held engaged slightly at steps Q24 and Q25. When the engine speed NE reaches higher than the critical speed of 590 rpm. at step Q17 and the transmission input shaft 12 increases its speed NI to the engine speed NE at step Q18, the clutch is engaged at step Q19. If the engine speed NE still stays at a speed NE lower than the critical speed of 590 rpm. even after a continuance of clutch-slipping, then, the clutch is disengaged at step Q9.

If brake is released or off at step Q26 while there is provided a reverse shift command signal at step 20, this indicates that the vehicle starts to be backed, then, engagement of the clutch (the clutch disk 15 and the pressure plate 16) takes place and progresses quickly at step Q27. Thereafter, when the engine decreases its speed NE lower than the critical speed of 590 rpm. at step Q28, then, the clutch is held engaged slightly at steps Q29 and Q30. In this instance, proper clutch-slipping is provided at a clutch separation of less than 3.2 mm. Thereafter, when the engine speed NE reaches higher than the critical speed of 590 rpm. at step Q31 and the transmission input shaft 12 increases its speed NI to the engine speed NE at step Q18, the clutch is engaged at step Q32. If the engine speed NE still stays at a speed NE lower than the critical speed of 590 rpm. even after a continuance of clutch-slipping, then, the clutch is disengaged at step Q33.

Figure 13:
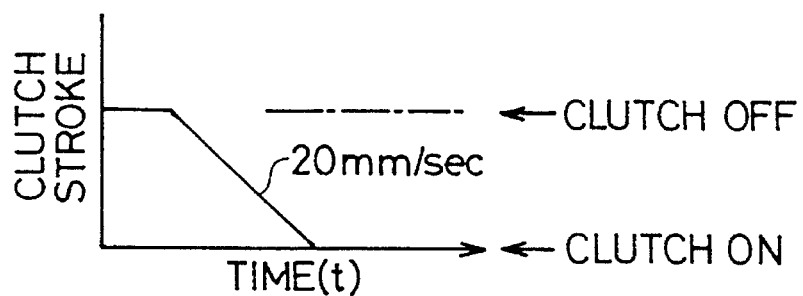
FIGS. 13–15 are diagrammatic views of clutch operational characteristics for various modes of vehicle start.
Figure 14:
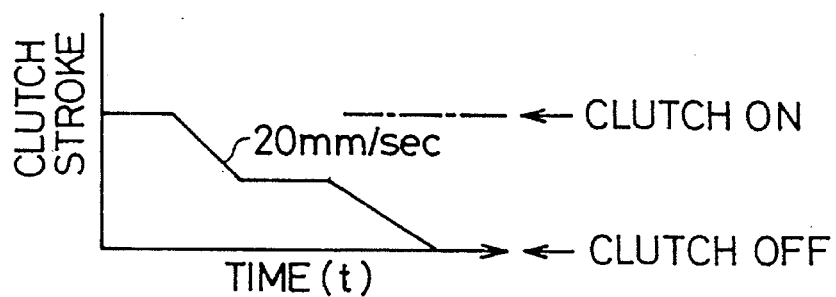
Figure 15:
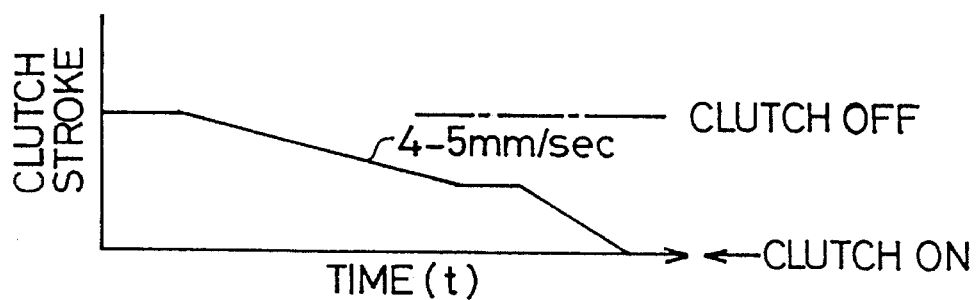

Engaging motions of the clutch are shown in FIGS. 13, 14 and 15 for the respective vehicle start modes, such as the quick start, the moderate start, the crawling start and the reverse start described above.

Figure 12A:
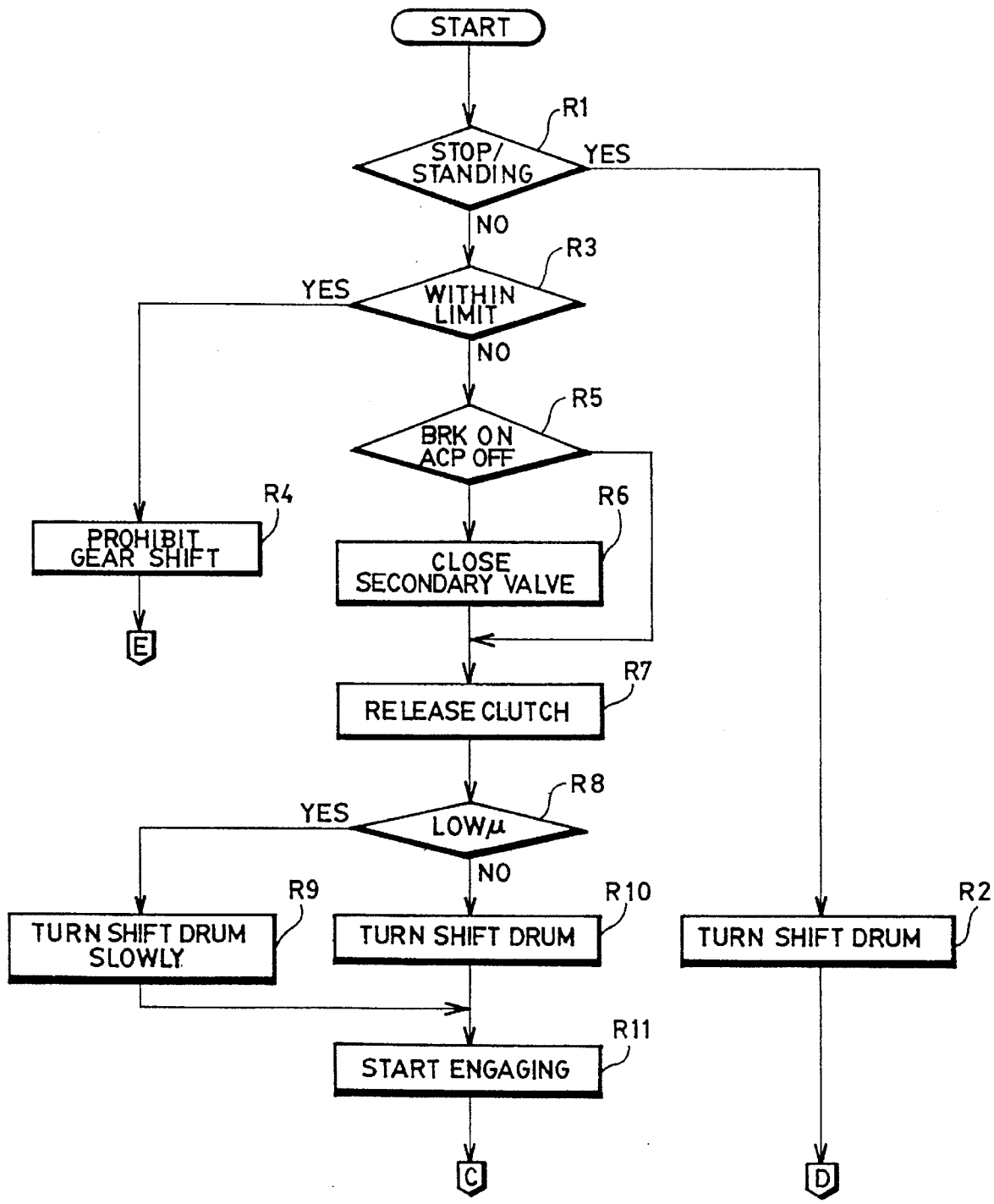
FIGS. 12A and 12B are a flow chart illustrating the shift control subroutine.
Figure 12B:
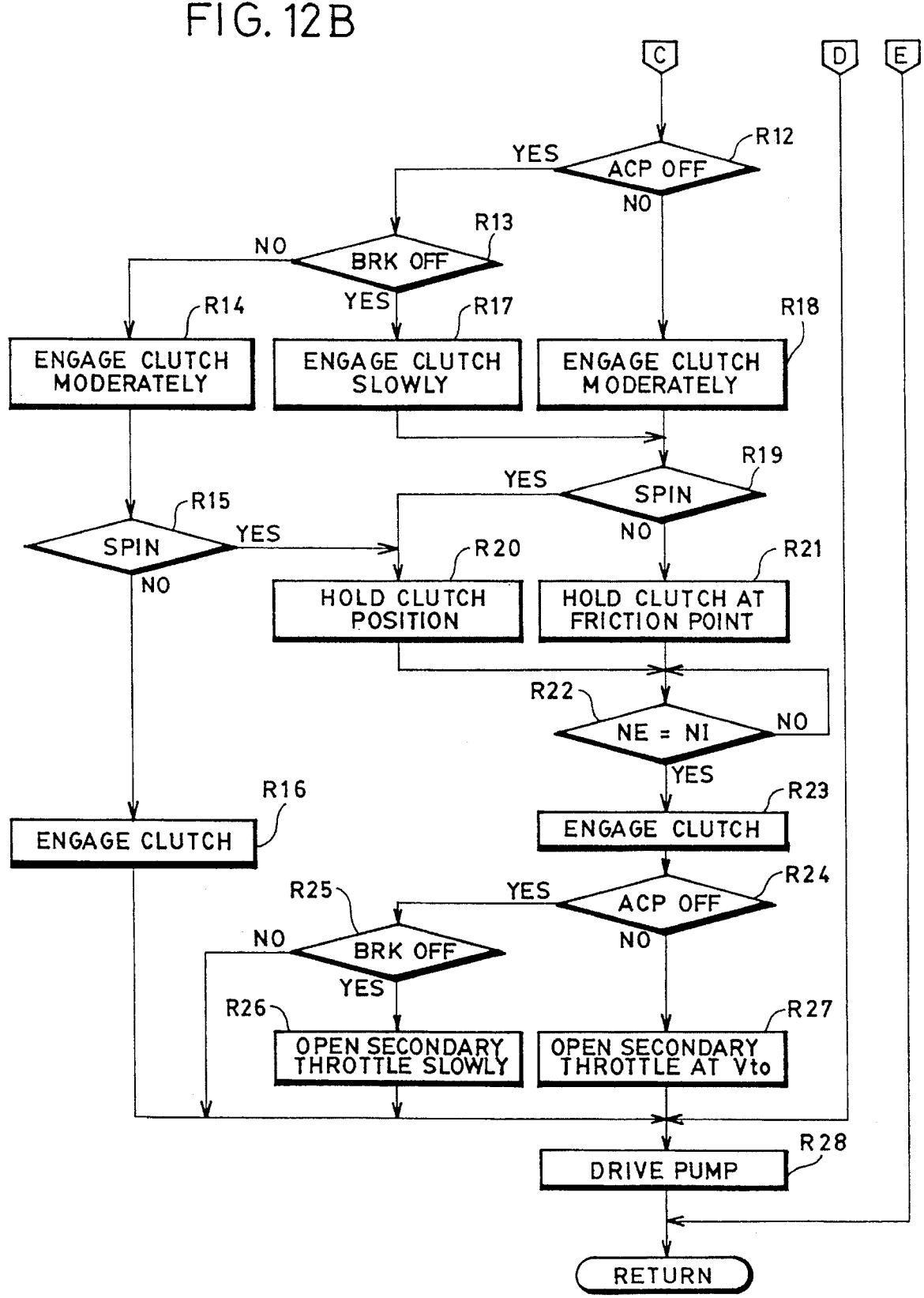

Referring to FIGS. 12A and 12B, which are a flow chart illustrating the shift control subroutine, control commences and proceeds directly to the first function at step R1 where a decision is made as to whether the vehicle is parked or standing. When the vehicle is parked or standing, then, after driving the shift drum 80 so as to place the transmission TM into a selected shift gear position at step R2 and driving the oil pump 123 at step R28, control returns to the main routine.

When the vehicle is not parked or standing, a decision is made at step R3 as to whether the turning radius with which the vehicle is turning is within critical limits. This decision is made based on yaw rates detected by the yaw rate sensor 147. If it is within the critical limits, then, an indication of "0" is displayed on the display 150 to indicate to the driver the prohibition of gear shifts at step R4 and control returns to the main routine.

When the vehicle is out of the critical limits, a decision is made at step R5 as to brake application and accelerator pedal operation. When brake is applied (BRK ON) and the accelerator pedal is released (ACP OFF), it is judged that the vehicle is being decelerated quickly. Upon the occurrence of quick deceleration, after controlling the motor 135 so as to bring the throttle valve 134 into idle position at step R6, the clutch is released at step R7. On the other hand, if quick deceleration is not judged, then, the clutch is released at step R7 without bringing the throttle valve 134 into idle position. In any way, after releasing the clutch at step R7, a decision is made as to the estimation of a frictional coefficient of road surface (which is hereafter referred to a surface frictional coefficient for simplicity) μ based on a road surface friction signal from the anti-skid braking system (ABS) at step R8. If the road surface has a considerably low surface frictional coefficient μ, it is judged that the road surface is very slippery, then, the actuators 91 and 92 of the shift mechanism 70 are operated so as to turn the shift drum 80 slowly until the transmission is brought into a selected gear at step R9. On the other hand, if the road surface has a moderate surface frictional coefficient μ, it is judged that the road surface is normal, then, the actuators 91 and 92 of the shift mechanism 70 are operated so as to turn the shift drum 80 at a normal speed of rotation at step R10. In this instance, the rotational speed of the shift drum 80 is mapped or programmed so as to accord with engine speeds NE and speed gears as parameters so as to increase with an increase in engine speed and decrease as the transmission TM is shifted up to higher speed gears. After the shift of the transmission TM into the selected gear at step R9 or step R10, the clutch starts to engage at step R11.

Subsequently, decisions are made at steps R12 and R13 as to acceleration and brake application, respectively. When the accelerator pedal is released (ACP OFF) and brake is not applied, engagement of the clutch takes place and progresses at a moderate speed at step R14, and a decision is subsequently made at step R15 as to whether slippage of the driving wheel is larger than a critical rate indicative of wheel spinning. If it is judged that there is not caused spinning on the drive wheels, then, engaging of the clutch is completed at step R16. Thereafter, the oil pump 123 is driven at step R28 and control returns to the main routine.

When brake is released (BRK OFF) while the accelerator pedal is released (ACP OFF), the clutch is engaged slowly at step R17, and a decision is subsequently made at step R19 as to whether slippage of the driving wheel is larger than the critical rate. However, when the accelerator pedal is not released (ACP OFF), engagement of the clutch takes place irrespective of brake application or brake release and progresses at a moderate speed at step R18. In any way, after the beginning of clutch engagement at step R17 or step R18, a decision concerning slippage is made at step R19. If it is judged that there is caused spinning on the drive wheels, then, after holding the clutch in the position at step R20, then the transmission input shaft 12 increases its speed NI to the engine speed NE at step R22, the clutch is completely engaged at step R23. This decision is repeatedly made at step R22 until the rotational speed NI of the transmission input shaft 12 reaches the engine speed NE. These steps take place as well when it is judged that there is not caused spinning on the drive wheels as a result of the decision made at step R19. On the other hand, there is caused spinning on the driving wheel, then, after holding the clutch at a friction point for clutch-slipping, the decision concerning the rotational speed NI of the transmission input shaft 12 is made. The frictional point of the clutch is mapped so as to accord with engine speeds NE and shift patterns as parameters.

When it is judged that the accelerator pedal is released (ACP OFF) at step R24 and that the brake is released (BRK OFF) at step R25, the motor 135 is controlled so as to open the secondary throttle valve 134 gradually at step R26, thereby preventing an occurrence of great change in torque which is called torque shock. On the other hand, if the accelerator pedal is judged to be applied (not ACP OFF) at step R24, then, the motor 135 is controlled so as to open the secondary throttle valve 134 at a rate of Vto. The rate of opening Vto is previously mapped or programmed such that it diminishes with a rise in torque and increases with a drop in torque. Then, after driving the oil pump 123 at step R28, control returns to the main routine.

The control system for the electronically controlled transmission TM provides for the clutch mechanism 10 consistency between manual clutch operation through the accelerator pedal and automatic clutch operation through the hydraulic actuator 25. Further, the control system ensures clutch operation even if the automatic clutch operating mechanism 14 improperly operates or does not operate.

In the operation of clutch mechanism 10, since the first and second release forks 21 and 28 are engaged with the axially movable bearing 18 in opposite axial directions, the clutch engaging operation and the clutch disengaging operation are performed without any mechanical interference between the first and second shift forks 21 and 28. Further, the clutch mechanism 10 in which the first and second release forks 21 and 28 are operationally linked so as to cause mutual follow-up action, the clutch operation is ensured even if the automatic clutch operating mechanism 14 improperly operates or does not operate. The symmetrical arrangement of the manual clutch actuator cylinder 20 and the automatic clutch actuator cylinder 25 avoids any mutual mechanical interference between the first and second shift forks 21 and 28, rendering the clutch mechanism 10 reliable to operate.

In the operation of shift mechanism 70, the combination of the axially offset arrangement of the row of counter-shaft gears 50 with respect to the row of main-shaft gears 60, and the order of arrangement of first to third cylindrical cam grooves 81–83 identical in axial direction with the order of arrangement of corresponding first to third synchronizing mechanisms 67–69 avoids or reduces a variation in operative length among the first to third shift rods 71–73. Consequently, a variation in the characteristics of transmissive force is considerably reduced among these shift rods, leading to smooth rotation of the shift drum 80.

The parallel arrangement of the shift drum 80 with respect to both transmission main shaft 45 and transmission counter shaft 46 and the offset arrangement of the shift drum 80 from a plane in which both rotational axes of transmission main shaft 45 and transmission counter shaft 46 lay provides the reduced overall height of transmission irrespective of the installation of shift drum 80 and enables the compact arrangement of shift drum 80 without a sacrifice of efficient arrangement of mechanical elements of the transmission TM. The offset arrangement of the shift rods 71–73 from the plane in which both rotational axes of transmission main shaft 45 and transmission counter shaft 46 lay provides the reduced overall height of transmission irrespective of the installation of shift rods 71–73 and enables the compact arrangement of shift rods 71–73 without a deterioration in the operation of shift rods 71–73 caused by the shift drum 80. The substantially parallel arrangement of pinion and rack mechanism 90 with respect to the plane in which both rotational axes of transmission main shaft 45 and transmission counter shaft 46 lay enables the rack 94 to be incorporated without extending the transmission casing sideways. Further, the rack 94 is arranged to pass through between extended lines of the rotational axes of transmission main shaft 45 and the shaft of shift drum 80, so as to prevent the transmission casing from expanding sideways.

The rotating rotor 99 always splashes oil toward the shift drum 80, lubricating sufficiently between the shift cam grooves 81–83 and the cam follower rollers 71a–73a and between the shift drum 80 and its shaft. The rotational speed and direction of transmission main shaft 45 is detected by means of the three sensors 101–103 with a high accuracy. Further, the rotational speed of transmission counter shaft 46 is detected with a high accuracy by the electromagnetic pick-up sensor 104 provided in association with the largest gear 48.

It is to be understood that although the present invention has been described with regard to preferred embodiments thereof, various other embodiments and variants may occur to those skilled in the art which are within the scope and spirit of the invention. For example, the cam follower rollers 71a–73a may be secured not through the annular rings 87–89 but directly to the shift rods 71–73, respectively. Further, in place of the shift lever 110, shift-up and shift-down levers and a drive range/reverse select switch may be provided on a steering wheel. Alternatively, the shift-up and shift-down levers may be installed in an instrument panel. Further, the shift lever is not always of the type causing a continuous gear shift but may be of the conventional manual type causing a stepwise gear shift. Such other embodiments and variants are intended to be covered by the following claims.

What is claimed is:

1. In an electronically controlled transmission comprising:

first shaft means for providing torque transfer comprising an input shaft through which torque is input to the transmission and an output shaft, arranged coaxially with said input shaft, through which torque is output from the transmission, a second shaft, arranged in parallel with the input shaft and the output shaft, through which rotation of said input shaft is transferred to said output shaft by one of a plurality of combinations of engagement between main gears mounted on said output shaft and counter gears mounted on said second shaft, and a rotatable cylindrical shift drum for moving a plurality of shift rods in an axial direction of said shift drum so as to selectively cause any one of the plurality of combinations of engagement between said main gears and said counter gears thereby shifting said transmission into any desired gear, an improvement comprising said rotatable drum at least partly overlapping said first shaft means in an axial direction and having a center axis of rotation which extends in parallel with center axes of rotation of said first shaft means and said second shaft and is offset from a plane in which said center axes of rotation of said first shaft means and said second shaft lay.

2. In an electronically controlled transmission as defined in claim 1, the improvement further comprising:

each said shift rod extending in parallel with said first shaft means and said second shaft and being located on one said of said plane where said center axes of rotation of said first shaft means and said second shaft lay.

3. In an electronically controlled transmission as defined in claim 1, the improvement further comprising:

a rack and pinion mechanism for causing rotation of said rotatable drum, said rack and pinion mechanism including a rack extending substantially in parallel with said plane.

4. In an electronically controlled transmission as defined in claim 3, the improvement further comprising:

said rack extending between said center axes of rotation of said first shaft means and said rotatable cylindrical shift drum.

5. In an electronically controlled transmission as defined in claim 1, the improvement further comprising:

said rotatable cylindrical shift drum being offset in a radial direction from said plane.

6. In an electronically controlled transmission as defined in claim 1, the improvement further comprising:

said rotatable cylindrical shift drum being formed with a plurality of cylindrical cam grooves which are engaged with said shift rods, respectively.

7. In an electronically controlled transmission as defined in claim 6, the improvement further comprising:

each said shift rod having a cam follower roller received in its respective cylindrical cam groove.

8. In an electronically controlled transmission as defined in claim 7, the improvement further comprising:

each said shift rod having an annular ring secured thereto which is mounted for slide movement in said axial direction on said rotatable cylindrical shift drum and to which said cam follower is attached.

9. In an electrically controlled transmission as defined in claim 1, the improvement further comprising:

said rotatable cylindrical shift drum being located rearward from an end of said second shaft close to an output end of said transmission as viewed in the axial direction and each said shift rod extending toward another end of said second shaft remote from said output end of said transmission.

10. In an electrically controlled transmission as defined in claim 1, the improvement further comprising:

said transmission having a reverse gear shaft for mounting thereon a reverse idle gear placed on a side of said plane, at which said rotatable cylindrical shift drum is located, but opposite to said rotatable cylindrical shift drum with respect to said first shaft means.

11. In an electrically controlled transmission as defined in claim 1, the improvement further comprising:

said rotatable cylindrical shift drum being placed above a horizontal plane including said center axes of rotation of said first shaft means.

* * * * *